United States Patent
Jiang et al.

(10) Patent No.: US 8,238,511 B2
(45) Date of Patent: Aug. 7, 2012

(54) NUCLEAR FUEL ASSEMBLY PROTECTIVE BOTTOM GRID

(75) Inventors: Hua Jiang, Lexington, SC (US); Paul Evans, Chapin, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 578 days.

(21) Appl. No.: 12/480,827

(22) Filed: Jun. 9, 2009

(65) Prior Publication Data

US 2010/0310034 A1    Dec. 9, 2010

(51) Int. Cl.
*G21C 3/34* (2006.01)
*G21C 3/32* (2006.01)

(52) U.S. Cl. ........ 376/438; 376/462; 376/439; 376/440; 376/442; 376/443; 376/444; 376/446

(58) Field of Classification Search .................. 376/438, 376/462, 439, 440, 442, 443, 444, 446
See application file for complete search history.

(56) References Cited

U.S. PATENT DOCUMENTS

| | | | |
|---|---|---|---|
| 4,096,032 A | | 6/1978 | Mayers et al. |
| 4,645,643 A | * | 2/1987 | Leclercq ........................ 376/447 |
| 4,804,516 A | * | 2/1989 | Thomazet et al. ............. 376/439 |
| 5,024,807 A | | 6/1991 | Hatfield et al. |
| 6,278,759 B1 | * | 8/2001 | Yoon et al. .................... 376/462 |
| 7,787,584 B2 | * | 8/2010 | Park et al. ...................... 376/441 |
| 7,889,829 B2 | * | 2/2011 | Lee et al. ....................... 376/438 |
| 2006/0045231 A1 | | 3/2006 | Lee et al. |

FOREIGN PATENT DOCUMENTS

JP    01242992 A  *  9/1989

* cited by examiner

*Primary Examiner* — Ricardo Palabrica
*Assistant Examiner* — Erin M Leach

(57) ABSTRACT

A protector bottom grid for a nuclear fuel assembly that includes three laterally staggered and horizontally oriented protrusions that extend into the fuel rod cell of a support grid below a vertically oriented spring. The three staggered protrusions extend into the cell a distance that maintains a space between the protrusions and the fuel rod. The vertically oriented spring biases the fuel rod against a dimple extending from the opposite cell wall that is at an elevation just above the spring. The protrusions below the spring trap incoming debris in the area of the fuel rod end cap and protect the fuel rod cladding from fretting.

18 Claims, 4 Drawing Sheets

NUCLEAR FUEL ASSEMBLY PROTECTIVE BOTTOM GRID

CROSS REFERENCE TO RELATED APPLICATIONS

This application is related to application Ser. No. 10/932,908, filed Sep. 2, 2004.

BACKGROUND OF THE INVENTION

1. Field of the Invention

The present invention relates generally to nuclear reactor fuel assemblies, and more particularly, is concerned with a debris filter bottom grid for a nuclear fuel assembly.

2. Description of Related Art

During manufacture, subsequent installation and repair of components of the nuclear reactor coolant circulation system, diligent effort is made to help assure the removal of all debris from the reactor vessel and its associated systems, which circulate coolant throughout the primary reactor coolant loop under various operating conditions. Although elaborate procedures are carried out to help assure debris removal, experience shows that in spite of the safeguards used to effect such removal, some chips and metal particles still remain hidden in the system. Most of the debris consists of metal turnings, which were probably left in the primary system after steam generator repair or replacement.

In particular, fuel assembly damage due to debris trapped at the lower most grid has been noted in several reactors in recent years. Debris enters through the fuel assembly bottom nozzle flow holes from the coolant flow openings in the lower core support plate when the plant is started up. The debris tends to be engaged in the lower most support grid of the fuel assembly within the spaces between the "egg-crate" shaped cell walls of the grid and the lower end portions of the fuel rod tubes. The damage consists of fuel rod tube perforations caused by fretting of the debris in contact with the exterior of the cladding tubes which sealably enclose the fissile material. Debris also becomes entangled in the lower nozzle plate holes and the flowing coolant causes the debris to gyrate, which tends to cut through the cladding of the fuel rods.

Several different approaches have been proposed and tried for carrying out the removal of debris from the nuclear reactors. Many of these approaches are discussed in U.S. Pat. No. 4,096,032 to Mayers et al. Others are illustrated and described in the various patents cross referenced in U.S. Pat. No. 4,900,507, assigned to the instant Assignee. While all of the approaches described in the cited patent and cross references operate reasonably well and generally achieve their objective under the range of operating conditions for which they were designed, a need still exists for a further improved approach to the problem of debris filtering in nuclear reactors, to address an improved reduction in pressure drop across the bottom nozzle that is required for more advanced fuel designs currently going under development and to address a stress corrosion cracking problem that has been experienced in some of the operating debris filtering grids; mainly those known as P-grids. That improvement is addressed in part in co-pending application Ser. No. 10/932,908, filed Sep. 2, 2004, and Ser. No. 10/51,349, filed Jan. 5, 2004. A further need exists to trap even smaller debris without substantially increasing the pressure drop across the fuel assembly while overcoming the fatigue problems experienced by the current P-grids due to flow induced vibrations and stress corrosion cracking due to the high stresses that are induced during manufacture.

SUMMARY OF THE INVENTION

The present invention provides a debris filter lower most grid in a fuel assembly designed to satisfy the aforementioned needs. The debris filter lower most grid of this invention is positioned just above the fuel assembly bottom nozzle and is generally formed from a spaced array of two sets of orthogonally arranged, parallel, spaced, elongated straps connected in an egg-crate lattice pattern. The lattice defines a number of cells, most of which support the fuel rods of the fuel assembly. Each of the cells that support fuel rods has walls with a cell height along the axial dimension of the fuel assembly equal to the width of one of the orthogonal arrangement of straps and a cell width along the elongated dimension of the straps equal to the distance between intersections of the straps. At least one wall of at least some of the cells that support fuel rods has at least two distinct protrusions that separately extend from the cell wall inwardly into the fuel rod cell on either side of the width of the wall near a corner of the fuel rod cell approximately at the same elevation along the cell height and spaced from the fuel rod that extends through the cell, at least at the beginning of life of the fuel assembly. A spring extends inwardly into the cell from the one wall above the protrusions and a dimple extends inwardly into the cell substantially centered along the width of the wall at an elevation between the two distinct protrusions and the spring. The spring is sized to contact the fuel rod that passes through the cell and the dimple is sized to be spaced from the fuel rod at least at the beginning of life of the fuel assembly.

Preferably, the lower most grid of this invention is positioned substantially adjacent the bottom nozzle which cooperates with the lower most grid as a debris filter. Additionally, the elevations of the protrusions preferably coincide to oppose the fuel rod end plug so that any fretting due to trapped debris will not impact the fuel rod cladding which is above the end plug.

In one embodiment, the protrusions are horizontally oriented with the dimple and/or spring vertically oriented. In still another embodiment, a second protrusion is located vertically adjacent each of the protrusions and extends in an opposite direction into an adjacent cell that supports a fuel rod. Similarly, a second dimple is positioned vertically adjacent the dimple and extends in the opposite direction into the adjacent cell that supports a fuel rod. Preferably, a third dimple extends in the opposite direction at a position vertically above the spring into the adjacent cell that supports a fuel rod and is gauged to provide contact support for the fuel rod in that adjacent cell. Preferably, the third dimple is oriented vertically and the second dimple is oriented horizontally.

Thus, the arrangement of dimples and protrusions provides improved debris trapping and the arrangement of dimples and springs provides improved support that will reduce damage due to vibration. Furthermore, the grid straps will be made from 0.0105 inch (0.0267 cm) thick nickel-plated alloy 718 straps that are brazed together and are heat treated with a "low temperature" anneal that will eliminate the stress corrosion cracking problem.

BRIEF DESCRIPTION OF THE DRAWINGS

A further understanding of the invention can be gained from the following description of the preferred embodiment when read in conjunction with accompanying drawings in which.

DESCRIPTION OF THE PREFERRED EMBODIMENT

Figure 1:
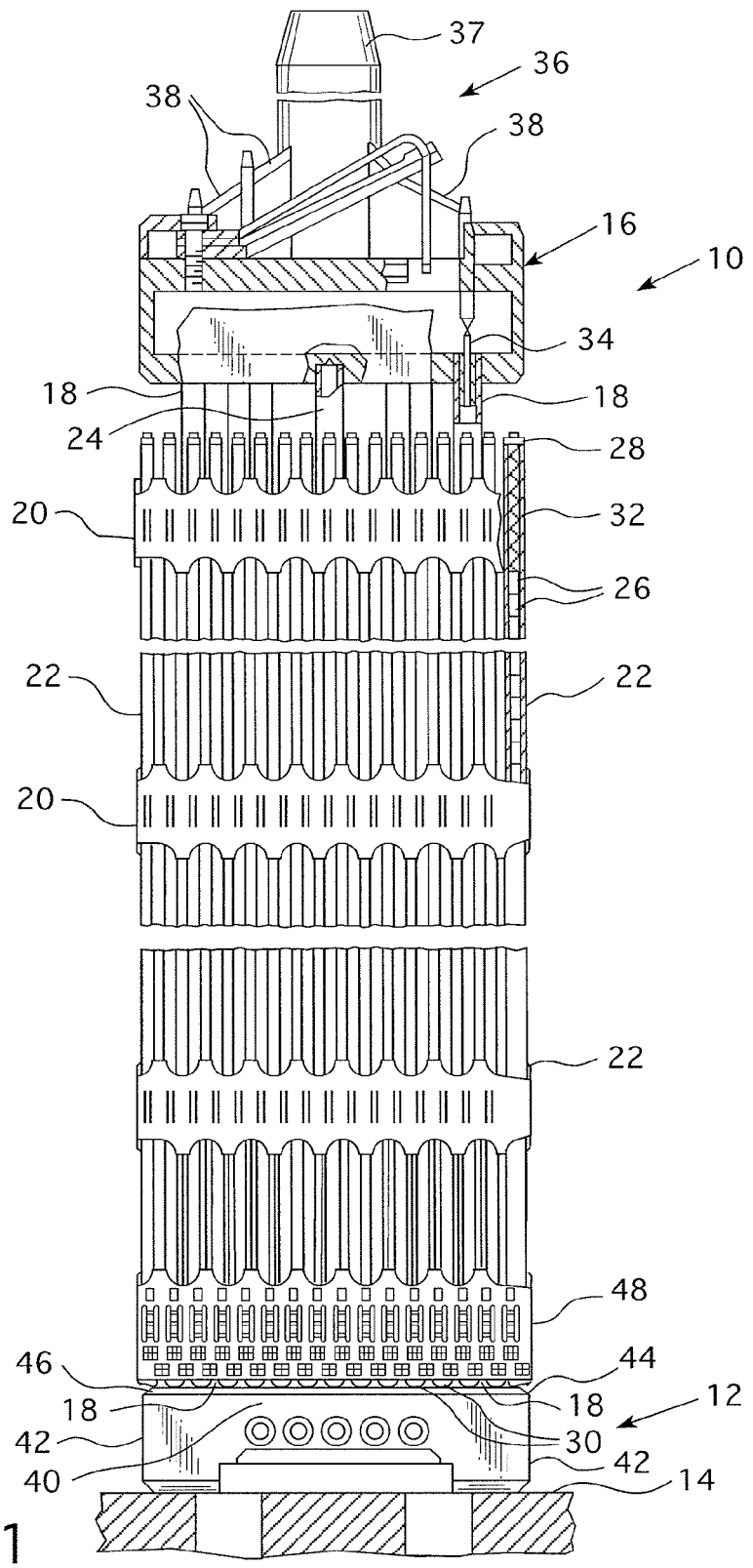
FIG. 1 is an elevational view, partially in section, of a fuel assembly in which the preferred embodiment of the debris trap of the present invention is incorporated, the assembly being illustrated in vertically shortened form, with parts broken away for clarity.

In the following description, like reference characters designate like or corresponding parts throughout the several views of the drawings. Also, in the following description, it is to be understood that such terms as "forward", "rearward", "left", "upwardly", "downwardly" and the like are words of convenience and are not to be construed as limiting terms.

Fuel Assembly

Referring now to the drawings and particularly to FIG. 1, there is shown an elevational view of a fuel assembly, represented in vertically shortened form and being generally designated by reference character 10. The fuel assembly 10 is the type used in a pressurized water reactor and has a structural skeleton which, at its lower end, includes the debris filter bottom nozzle 12, which is described more fully in co-pending application Ser. No. 10/751,349. The bottom nozzle 12 supports the fuel assembly 10 on a lower core support plate 14 in the core region of the nuclear reactor (not shown). In addition to the bottom nozzle 12, the structural skeleton of the fuel assembly 10 also includes a top nozzle 16 at its upper end and a number of guide tubes or thimbles 18, which extend longitudinally between the bottom and top nozzles 12 and 16 and at opposite ends are rigidly attached thereto.

The fuel assembly 10 further includes a plurality of transverse grids 20 axially spaced along, and mounted to, the guide thimbles 18 and an organized array of elongated fuel rods 22 transversely spaced and supported by the grids 20. Also, the assembly 10 has an instrumentation tube 24 located in the center thereof and extending between and either captured by or mounted to the bottom and top nozzles 12 and 16. With such an arrangement of parts, fuel assembly 10 forms an integral unit capable of being conveniently handled without damaging the assembly of parts.

As mentioned above, the fuel rods 22 in the array thereof in the assembly 10 are held in spaced relationship with one another by the grids 20 spaced along the fuel assembly length. Each fuel rod 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The fuel pellets 26, composed of fissile material, are responsible for creating the reactive power of the reactor. A liquid moderator/coolant such as water or water containing boron, is pumped upwardly through a plurality of flow openings in the lower core plate 14 to the fuel assembly. The bottom nozzle 12 of the fuel assembly 10 passes the coolant upwardly through the guide tubes 18 and along the fuel rods 22 of the assembly in order to extract heat generated therein for the production of useful work.

To control the fission process, a number of control rods 34 are reciprocally movable in the guide thimbles 18 located at predetermined positions in the fuel assembly 10. Specifically, a rod cluster control mechanism 36 positioned above the top nozzle 16 supports the control rods 34. The control mechanism has an internally threaded cylindrical member 37 with a plurality of radially extending flukes or arms 38. Each arm 38 is interconnected to a control rod 34 such that the control rod mechanism 36 is operable to move the control rods vertically in the guide thimbles 18 to thereby control the fission process in the fuel assembly 10, all in a well-known manner.

Debris Filter Bottom Nozzle

As mentioned above, fuel assembly damage due to debris trapped at or below the lower most one of the grids 20 supporting the fuel bearing regions of the fuel rods has been found to be a problem. Therefore, to prevent the occurrence of such damage, it is highly desirable to minimize the debris that passes through the bottom nozzle flow holes or the interfaces between the outlets of the bottom nozzle flow holes and the adjoining structures.

The invention described in U.S. patent Ser. No. 10/751, 349, relates to a bottom nozzle 12 which, in addition to supporting the fuel assembly 10 on the lower core support plate 14, also contains features which function to filter out potentially damaging sized debris from the coolant flow passed upwardly through the bottom nozzle, with a reduction in pressure drop over previous designs. The bottom nozzle 12 includes support means, for example, the skirt 40 shown in FIG. 1. The support means, skirt 40 in this embodiment, includes a plurality of corner legs 42 for supporting the fuel assembly 10 on the lower core support plate 14. A generally rectangular planar plate 46 commonly referred to as the bottom nozzle adapter plate is suitable attached, such as by welding, to the upper surface 44 of the support skirt 40. In the nozzle adapter plate 46 of the debris filter bottom nozzle 12, a large number of small holes (not shown) are concentrated in the area of the flow holes through the lower core support plate 14 and are sized to filter out damaging sized debris without adversely affecting flow or the pressure drop through the bottom nozzle adapter plate 46 and across the fuel assembly 10, which substantially covers every portion of the plate 46 across its length and breadth.

The diameter of the flow holes through the bottom nozzle adapter plate 46 does not allow passage of most of the debris that is of the size typically caught in the lower most support grid 20. If the debris is small enough to pass through these plate flow holes, it will in most case also pass through the grids 20 since the diameter of flow holes are small enough to catch most of the debris having a cross section larger than that of unoccupied spaces through a fuel bearing cell of the support grid 20. By ensuring that most of the debris is small enough to pass through the grids unoccupied spaces, the debris filter bottom nozzle 12 significantly reduces the potential for debris induced fuel rod failures. It should be appreciated that the improvement of co-pending U.S. application Ser. Nos. 10/751,349 and 10/932,908 do not require that the narrowest cross section of the flow through holes in the bottom nozzle adapter plate 46 be equal to or smaller than the largest cross sectional dimension of the unoccupied spacers through a fuel bearing cell of the support grid 20, especially when the outlet of the flow through the holes in the adapter plate effectively operate in junction with adjoining structures, such as this invention, to further constrict the flow path. For example, when protective grids such as that of this invention, are employed, which typically are located approximately 0.025 to 0.125 inches (0.064 to 0.318 cm) above the nozzle plate 46, the grid straps and protrusions further delimit the flow and trap debris in the area within and between the protective grid and the nozzle adapter plate 46.

Debris Filter Protective Grid

The improved debris catching system of this invention provides an integrated spacer grid design to be used in a nuclear fuel assembly to support fuel rods and filter entrained debris in the coolant without substantially changing the overall height of the grid over conventional designs, which is approximately 1.522 inches (3.866 cm.) for the inner strap design. The spacer grid design has multi-level debris catching features which provide the debris filtering function. The filtering features include debris filtering arches, which may be similar to the dimples which support the fuel rods under the pressure of opposing grid springs, except that the debris filtering arches do not contact the fuel rods, but reduce the fretting wear by trapping debris at fuel rod solid end plug elevations. Three debris catching systems, working with the debris filter bottom nozzle described above, provide an improved integrated design.

Figure 2:
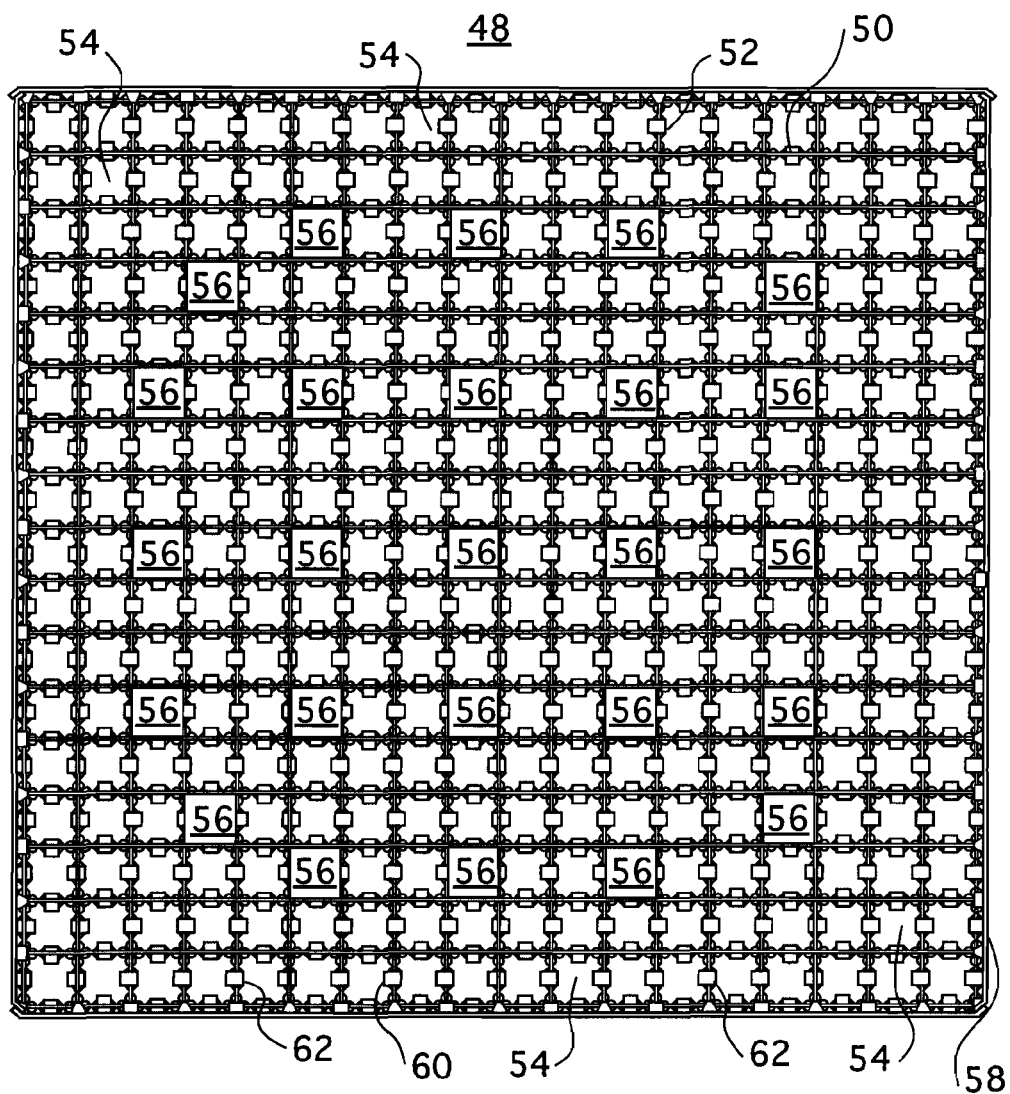
FIG. 2 is a planned view of a nuclear reactor grid incorporating this invention.

Like many conventional spacer grids, the lower most spacer grid 48 of this invention is comprised of straight grid straps 50 and 52 that are interleaved together to form an egg-crate configuration having a plurality of roughly square cells 54 and 56 as shown in FIG. 2. A spaced, parallel array of a plurality of grid straps 50 of equal length are positioned orthogonal to a second plurality of spaced, parallel grid straps 52 of equal length and are encircled by a border strap 58, with each of the straps being welded together at their intersections. The cells 54 support fuel rods while the cells 56 support guide tubes and an instrumentation tube which passes through the center cell. Because the fuel rods must maintain a spacing or pitch between each other, these straight straps 50 and 52 at the locations that border the cells 54 that support the fuel rods have springs 60 and/or dimples 62 that are stamped in the sides of the straps 50, 52 and 58 to protrude into the cells 54 to contact the fuel rods and hold them firmly in position. The stamped features on the grid straps 50 and 52, i.e., the springs 60 and the dimples 62, require careful design and precise manufacturing to assure adequate forces are maintained to secure the fuel rods when considered in combination with the other grids 20 in the tandem array of grids along the fuel assembly.

Figure 3:
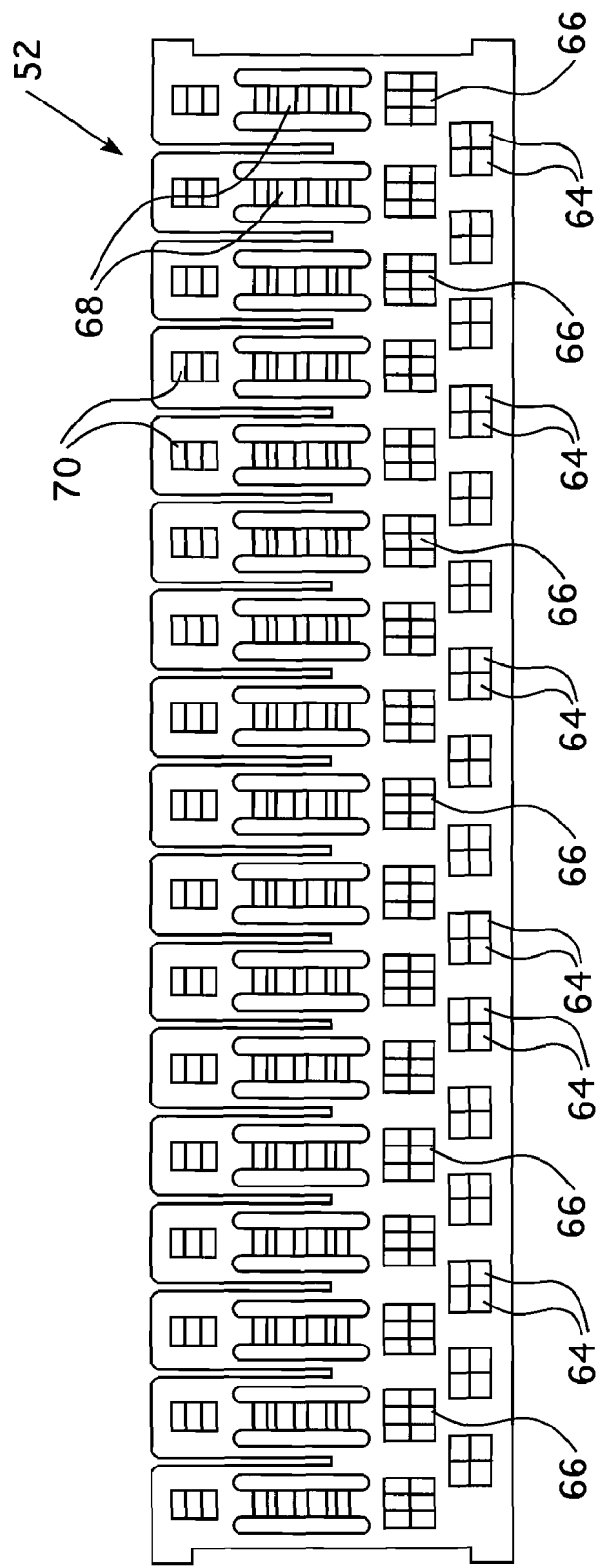
FIG. 3 is a side view of one of the interior straps of the grid of this invention which borders on cells that only support fuel rods.
Figure 4:
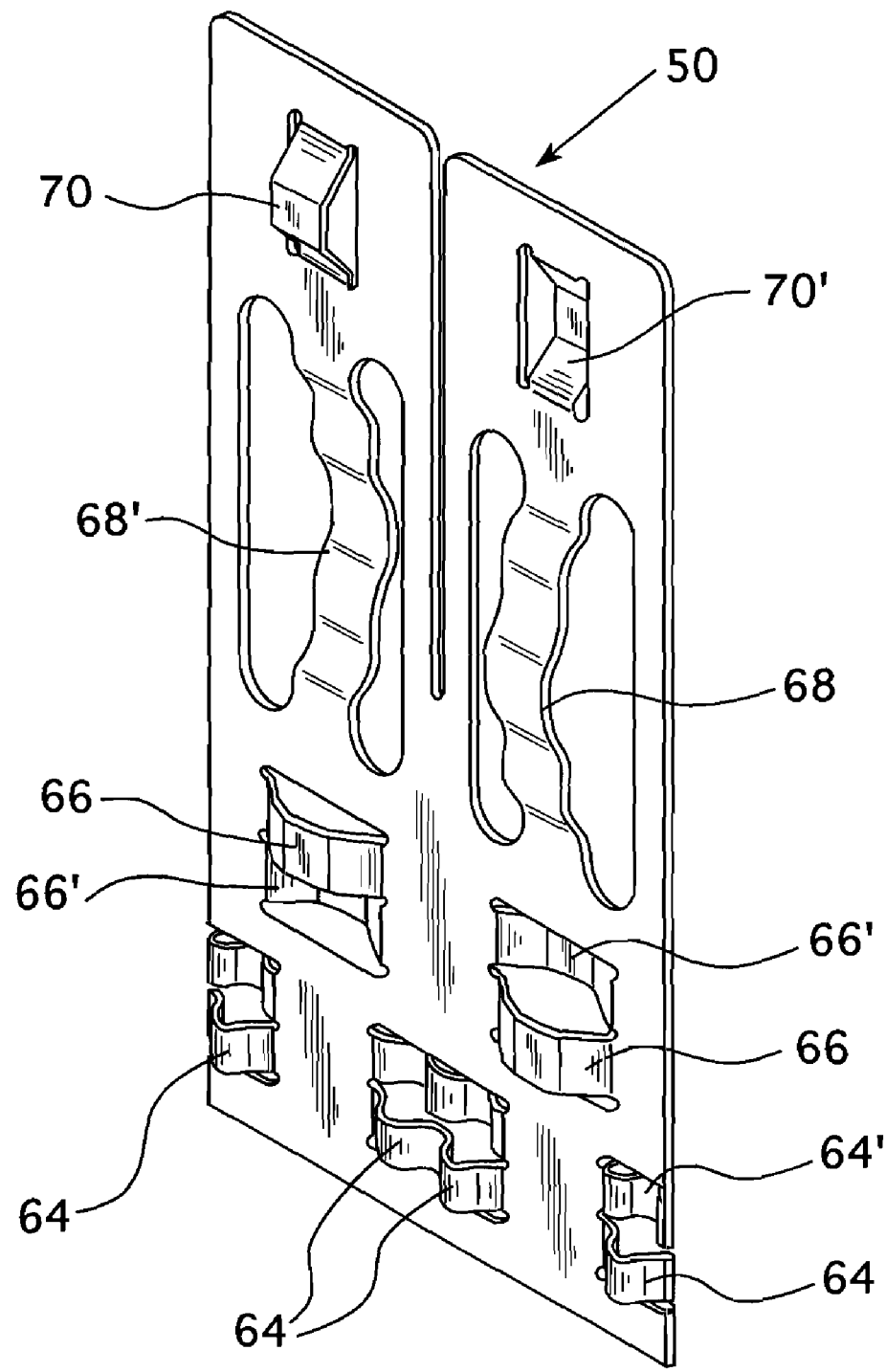
FIG. 4 is an elevational view showing a portion of the strap of the protective grid of this invention that spans two cells that support fuel rods on either side.

The grid 48 of this invention, as can better be appreciated from FIGS. 3 and 4 also includes on each wall of the cells 54 that support fuel rods, a laterally oriented arch at each lower corner with an additional laterally oriented dimple 66 approximately centered laterally on the wall and spaced above the arches 64. The additional dimples 66 substantially covers the lateral distance between the arches 64 though it should be appreciated that the width of the arches 64 could be increased and the width of the dimples 66 decreased so long as the combined width of the arches 64 and the dimple 66 substantially cover the width of the wall of the cell. The arches 64 and the dimple 66 extend approximately the same distance into the cell and are sized so that they do not contact the fuel elements. The sole function of the arches 64 and the dimple 66 is to catch debris. Similarly, a second pair of arches 64' and a dimple 66' are formed just above the arches 64 and dimples 66, just described, but the latter arches and dimple extend in the opposite direction into the adjacent cell to perform the same function in the adjacent cell. An additional dimple 70 and 70', oriented in the vertical direction, protrudes into the adjacent cells and is designed to contact the fuel rods which are pressured against the dimples 70 and 70' respectively by springs 68 and 68' protruding into the adjacent cells from the opposite cell walls. A vertically oriented spring 68 is substantially centered on the wall between the dimple 66 and the dimple 70 and protrudes into the cell to contact and pressure the fuel rod against a corresponding dimple 70 on the opposite cell wall. The springs and dimples on adjacent cell walls on a given strap 50, 52 protrude in opposite directions as shown in FIG. 4. Of the two vertically adjacent dimples 66 and 66' the upper dimple 66' is always the one that contacts and supports the fuel rod while the lower one is spaced from the fuel rod and performs the debris catching function in conjunction with the arches 64. The lower arches 64 on a given strap are always stamped in the same direction with the upper arches 64' stamped in the opposite direction so that all of the corresponding arches have the same elevation, from cell to cell and extend in the same direction, for ease of manufacture. The springs 68 bias the fuel rods against the dimples 66' and 70 on the opposite walls of the cell while the arches 64 and dimples 66 cooperate to trap debris. The straps 50, 52 are preferably made from a 0.0105 inch (0.0267 cm) nickel plated alloy-718, are brazed together and are heat treated using a "low temperature" anneal. The "low temperature" anneal avoids the excessive grain growth experienced by the prior art using a "high temperature" anneal. The "low temperature" anneal temperature range is 950~1000° C. and the "high temperature" anneal temperature range is 1030~1070° C. The excessive grain growth is believed to have caused the stress corrosion cracking experienced by the prior art. The fatigue issues which are currently observed in the prior art grids will be overcome because the new grid design of this invention will be a stiffer structure that will not have the same vibration characteristics as the prior art lower most grid. While the grid is stiffer, its height, approximately 2.025 inch (5.141 cm.) for the inner strap, is not increased over that of the prior art so it will not adversely affect the stiffness of the fuel assembly. It should be noted that the straps illustrated in FIGS. 3 and 4 are straps that correspond to one of the rows within the fuel assembly of FIG. 2 that does not interface with the cell that is attached to a control rod guide thimble. The walls of the cells that interface with the guide thimbles have neither arches, dimples or springs which extend into those cells 56.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A fuel assembly for a nuclear reactor including:
   a plurality of elongated nuclear fuel rods having an extended axial length;
   at least a lowermost grid supporting said fuel rods in an organized array and having unoccupied spaces defined therein to allow a flow of fluid coolant there-through and past said fuel rods when said fuel assembly is installed in the nuclear reactor;
   a plurality of guide thimbles extending along said fuel rods through and supporting said grid;
   a bottom nozzle disposed below said grid, below lower ends of said fuel rods and supporting said guide thimbles and permitting the flow of fluid coolant into said fuel assembly, said bottom nozzle comprising a substantially horizontal plate extending transverse to the axis of the fuel rods and having an upper face directed toward said lowermost grid, said upper face of said plate having defined there-through a plurality of flow through holes extending completely through said plate for the passage of the fluid coolant from a lower face of said plate to the upper face of said plate, each of said coolant flow through holes in fluid communication with said unoccupied spaces; and said lowermost grid comprising a first, spaced, parallel arrangement of elongated straps extending along a plane substantially orthogonal to the axis of the fuel assembly and a second, spaced, parallel arrangement of elongated straps extending along the plane substantially orthogonal to the axis of the fuel assembly and perpendicular to the first, spaced, parallel arrangement of elongated straps in an egg-crate lattice arrangement that defines a plurality of cells therein through which the fuel rods and guide thimbles pass, each of a first plurality of said cells, through which the fuel rods pass, having walls respectively with a cell height along the axial dimension of the fuel assembly equal to the width of one of the first and second, spaced, parallel arrangement of elongated straps and a cell width along the elongated dimension of the corresponding, elongated strap, and at least one wall of at least some of the first plurality of said cells having at least two distinct protrusions that are arches curved about the vertical axis of the cell and separately extend from the at least one wall inwardly into the at least some of the first plurality of cells on either side of the width near a corner of the at least one wall approximately at the same elevation along the cell height and spaced apart from the nuclear fuel rods at least at the beginning of life of the fuel assembly, a spring extends inwardly into the cell from the at least one wall above the protrusions and a dimple extends inwardly into the at least some of the first plurality of cells substantially centered along the width of the at least one wall at an elevation between the two distinct protrusions and the spring, the spring is sized to contact the fuel rod that passes through a corresponding one of the at least some of the first plurality of cells and the dimple is sized to be spaced apart from the nuclear fuel rod at least at the beginning of life of the fuel assembly.

2. The fuel assembly of claim 1 wherein the lowermost grid is positioned substantially adjacent the bottom nozzle.

3. The fuel assembly of claim 2 wherein the bottom nozzle is a debris filter.

4. The fuel assembly of claim 1 wherein at least some of the protrusions on the lowermost grid are located at a height along the cell wall coinciding with an elevation of a lower end plug on a corresponding fuel rod.

5. The fuel assembly of claim 4 wherein all of the lowermost protrusions in the at least one wall of the lower most grid are located at the height along the cell wall coinciding with the elevation of the lower end plug of the fuel rod.

6. The fuel assembly of claim 5 wherein substantially all of the protrusions in the at least one wall of the lower most grid are located at the height along the cell wall coinciding with the elevation of the lower end plug of the fuel rod.

7. The fuel assembly of claim 6 wherein substantially all of the protrusions in the at least one wall of the lower most grid are located at the height along the cell wall coinciding with the elevation of a solid portion of the lower end plug of the fuel rod.

8. The fuel assembly of claim 6 wherein substantially all of the protrusions are located at the height along the cell wall coinciding with an elevation below a cladding wall of the fuel rod.

9. The fuel assembly of claim 1 wherein the arches are formed from a stamped portion of the cell wall connected to the cell wall at a base of the arch.

10. The fuel assembly of claim 1 wherein the arches are elongated with the elongated dimension of the arches extending laterally across a portion of the width of the cell walls of the first plurality of cells in a horizontal direction.

11. The fuel assembly of claim 1 wherein the protrusions are horizontally oriented.

12. The fuel assembly of claim 1 wherein the dimple is oriented horizontally and the spring is oriented vertically.

13. The fuel assembly of claim 1 wherein vertically adjacent each of the protrusions a second protrusion extends from the at least one wall in an opposite direction to the protrusions and into an adjacent one of the at least some of the first plurality of cells.

14. The fuel assembly of claim 13 wherein vertically adjacent the dimple (hereafter the first dimple) a second dimple extends from the at least one wall in the opposite direction to the first dimple into the adjacent one of the at least some of the first plurality of cells, the first dimple extending from the at least one wall into the at least some of the first plurality of cells a distance that is spaced apart from a corresponding one of the fuel rods passing through the cell and the second dimple extending from the at least one wall into the adjacent one of the at least some of the plurality of cells a distance that contacts a corresponding one of the fuel rods passing through the adjacent cell.

15. The fuel assembly of claim 14 wherein a third dimple extends in the opposite direction from the at least one wall at a position vertically above the spring into the adjacent one of the at least some of the first plurality of cells.

16. The fuel assembly of claim 15 wherein the third dimple is oriented vertically and the second dimple is oriented horizontally.

17. The fuel assembly of claim 1 wherein the cell height is approximately 2.025 inches (5.141 cm).

18. A grid for a nuclear fuel assembly comprising:
a first, spaced, parallel arrangement of elongated straps extending along a plane substantially orthogonal to the axis of the fuel assembly;
a second, spaced, parallel arrangement of elongated straps extending along the plane substantially orthogonal to the axis of the fuel assembly and perpendicular to the first, spaced, parallel arrangement of elongated straps in an egg crate lattice arrangement that defines a plurality of cells therein respectively through which either a fuel rod or a guide thimble passes; and
each of a first plurality of said cells, through which the fuel rods pass, having walls respectively with a cell height along the axial dimension of the fuel assembly equal to the width of one of the first and second, spaced, parallel arrangement of elongated straps and a cell width along the elongated dimension of the corresponding, elongated strap, and at least one wall of at least some of the first plurality of said cells having at least two distinct protrusions that are aches curved about the vertical axis of the cell and separately extend from the at least one wall inwardly into the at least some of the first plurality of cells on either side of the width near a corner of the at least one wall approximately at the same elevation along the cell height and spaced apart from the nuclear fuel rods at least at the beginning of life of the fuel assembly, a spring extends inwardly into the cell from the at least one wall above the protrusions and a dimple extends inwardly into the at least some of the first plurality of cells substantially centered along the width of the at least one wall at an elevation between the two distinct protrusions and the spring, the spring is sized to contact the fuel rod that passes through a corresponding one of the at least some of the first plurality of cells and the dimple is sized to be spaced apart from the nuclear fuel rod at least at the beginning of life of the fuel assembly.

* * * * *